Patented Feb. 23, 1943

2,312,135

UNITED STATES PATENT OFFICE 2,312,135

METHOD OF PREPARING VALUABLE NITROGENOUS CONDENSATION PRODUCTS

Heinrich Ulrich and Karlhugo Kuespert, Ludwigshafen-on-the-Rhine, Germany, assignors, by mesne assignments, to General Aniline & Film Corporation, New York, N. Y., a corporation of Delaware No Drawing. Application May 12, 1938, Serial No. 207,504. In Germany May 18, 1937

3 Claims. (Cl. 260—584)

This invention relates to a new method of preparing valuable nitrogenous condensation products.

We have found that valuable nitrogenous condensation products can be prepared by causing compounds of the formula X—R (in which R is an alkyl, cycloalkyl, aralkyl or aryl radicle or a heterocyclic radicle, which may be substituted, and X is an exchangeable substituent, i. e. it may be a halogen atom or an exchangeable group, as for example a —O—CO—Cl group or a —O—SO$_3$H group (free or as salt)) to act with the aid of metal compounds having an alkaline action on organic compounds containing in the molecule only such nitrogen atoms as are free from hydrogen directly attached thereto and containing at least one alkylol group attached to basic nitrogen.

Among suitable metal compounds having an alkaline action may be mentioned the oxides, hydroxides or alcoholates of alkali or alkaline earth metals, and also weakly alkaline salts, such as sodium or potassium carbonate, sodium acetate and also sodamide.

Suitable alkylol compounds of the kind defined are for example triethanolamine, the tripropanolamines, ethyldiethanolamine, cyclohexyl-diethanolamine, diethanolaniline, N-ethanolpiperidine, benzyl-diethanolamine, N-ethanolmorpholine, N - ethanoltetrahydroquinoline, diethanoldiethyl-ethylene diamine, tetra-ethanol - ethylene diamine, tetra - ethanol - paraphenylene diamine and the like. Compounds of the said kind which contain further substituents, as for example carboxyl groups (in the free form or combined in the form of salts, amides or esters) or ether residues or polyether chains, may also be used.

Among suitable compounds of the formula X—R there may be mentioned methyl iodide, ethyl bromide, ethylene chlorhydrin, epichlorhydrin, beta, beta'-dichlordiethyl ether, butyl chloride, dodecyl bromide, octodecyl bromide, alkyl chloride mixtures desired from the hydrocarbons having the carbon skeleton of the fatty acid mixtures contained in naturally occuring fats, chlorinated petroleum fractions, cyclohexyl chloride, benzyl chloride, nitrochlorbenzene and chlorpiperidine. Compounds having exchangeable groups may also be used, as for example chlorocarbonic acid esters, as for example octodecyl chlorocarbonic acid ester from which carbon dioxide is frequently split off during the reaction so that ether-like combination of the alkyl radicle contained in the ester takes place. Suitable compounds containing sulphuric acid ester groups are for example octodecyl or octodecenyl alcohol sulphuric acid ester, butyl polyglycol ether sulphuric acid ester, ethylene chlorhydrin sulphuric acid ester, which are best used in the form of their salts, advantageously the sodium salts.

The alkylol compounds may first be reacted with the alkaline-acting metal compounds, as for example the oxides, hydroxides or alcoholates of alkali or alkaline earth metals in the presence or absence of diluents or solvents. When working in the presence of water, it is preferable to remove the same completely or to a great extent towards the end, advantageously by distilling it off. When working in the presence of indifferent solvents, as for example benzene or toluene, these may be subsequently distilled off or the following reaction with compounds of the formula X—R may be carried out in the presence of the same. The amount of alkaline-reacting metal compounds to be used depends on what amount of the halogen compounds or the like is subsequently to be brought into reaction.

The reaction of the compounds X—R on the said alkylol compounds with the aid of the alkaline-reacting metal compounds often takes place even at room temperature, so that sometimes cooling may be preferable or even necessary. When employing compounds which react with difficulty it is often advantageous to work while heating in order to carry out the reaction completely. The water split off or, when using alcoholates, the alcohol split off during the reaction is preferably distilled off, if desired with the co-employment of inert gases or in vacuo. The reaction may be carried out in the presence of diluents or solvents. When using components or diluents of low boiling point it may be advantageous or necessary to work under pressure.

Instead of first reacting the compounds containing alkylol groups separately with the alkali hydroxides or the other alkaline-reacting metal compounds and then with compounds of the formula R—X, the alkylol compounds may be brought into reaction with the compounds of the formula X—R in the presence of the alkali hydroxides or the like. The solubility of the products may be increased, when desired, by sulphonation or hydroxyalkylation, as for example by means of ethylene oxide or epichlorhydrin.

Especially valuable products are obtained when acyl groups are introduced before or after the said condensation. When starting from alkylol compounds which contain, in addition to the alkylol groups intended for the etherification further hydroxyl groups (which may also be contained in alkylol groups), the acyl groups may enter wholly or in part into these hydroxyl groups. The acylation may also be effected on nitrogen.

The radicles of formic acid, acetic acid, butyric acid, oleic acid, benzoic acid, phthalic acid, malonic acid, of quinoline carboxylic acids, taurine, toluene sulphonic acids or naphthalene sulphonic acids may be introduced, the free acids or suitable derivatives, as for example the acid halides, esters or anhydrides, being used and working being effected if desired in the presence of agents binding acids. The acid radicles of carboxylic acid mixtures may also be introduced, as for example of those which are contained in palm kernel or coconut oil or which are formed by the oxidation of high molecular weight paraffin hydrocarbons.

The products obtainable according to this invention are valuable assistants for the dyeing, textile, leather, paper and synthetic material industries or intermediate products for the preparation of such assistants. Many of the products may be used with special advantage in the preparation or improvement of artificial fibres. Many of them, in particular the products of low molecular weight, may serve as mercerizing wetting agents. The products are also suitable for increasing the capacity of artificial fibres for being dyed and as softening agents for the same.

The following examples will further illustrate how the said invention may be carried out in practice, but the invention is not restricted to these examples. The parts are by weight.

Example 1

80 parts of caustic soda are added to 150 parts of triethanolamine. Heating thus takes place and a solid white product is formed. 580 parts of octodecyl chloride are then added and the whole heated in vacuo to about 120° C. The water formed in the reaction is thus distilled off.

The product is mixed while still warm with about 1000 parts of water, the base of the composition:

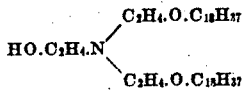

thus formed being thus separated in a practically pure form. It may be converted by the addition of acids, as for example formic acid or hydrochloric acid, into salts of better solubility which are valuable textile assistants. They may also be used in textile improvements in emulsified form.

By using 40 parts of caustic soda and 290 parts of octodecyl chloride instead of the abovementioned amounts, the compound:

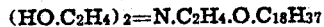

is obtained.

Instead of heating in vacuo, a current of nitrogen may be led through. The reaction is advantageously carried out while stirring.

Instead of octodecyl chloride there may also be used mono- or tri-chlor-hard-paraffin-wax or the alkyl chloride mixture of the hydrocarbons having the carbon skeleton of the fatty acids of palm kernel or train oil, or octodecenyl alcohol sulphuric acid ester.

Example 2

The reaction product of 150 parts of triethanolamine and 80 parts of caustic soda described in Example 1 is treated under the conditions described in Example 1 with 665 parts of octodecyl chlorocarbonic acid ester. The product soluble in acid thus formed contains in the molecule two radicles derived from octodecyl alcohol of which one is probably combined in the form of an octodecyl carbonic acid ester radicle and the other in the form of an octodecylether radicle, each to an ethanol group of the triethanolamine.

By using 40 parts of caustic soda instead of 80 parts and by using 333 parts of octodecyl chlorocarbonic acid ester instead of 665 parts, a compound is obtained which contains only one radicle derived from the octodecyl chlorocarbonic acid ester.

Instead of octodecyl chlorocarbonic ester there may also be used octyl chlorocarbonic acid ester or dodecyl chlorocarbonic acid ester.

Example 3

150 parts of triethanolamine, 290 parts of octodecyl chloride and 42 parts of caustic soda are mixed while stirring and the mixture is heated to from 130° to 140° C. so that the water formed distils off. The octodecyl ether of triethanolamine is obtained.

Example 4

150 parts of triethanolamine are stirred with 78 parts of sodamide while heating gently until the evolution of ammonia ceases. The whole is then heated with 580 parts of octodecyl chloride to from 130° to 140° C. and kept at this temperature until chlorine can no longer be detected in the base formed. The product forced is the dioctodecyl ether of triethanolamine.

Example 5

150 parts of triethanolamine are mixed with 250 parts of ethylene chlorhydrin glycol ether. 165 parts of anhydrous sodium acetate or 200 parts of potassium carbonate are then added and the whole heated to about 140° C. the water of reaction thus being distilled off. The product is suitable as a wetting agent after sulphonation.

Example 6

650 parts of dioctodecyl triethanolamine ether are heated with 284 parts of stearic acid in vacuo at 140° C. until water no longer distils off. The product thus obtainable, which is soluble in organic solvents, is suitable for rendering textiles water-repelling.

Example 7

398 parts of stearic acid diethanolamide (obtained by heating stearic acid and diethanolamine to 150° C.) are mixed with 275 parts of a technical mixture of cetyl and octodecyl chlorides. 42 parts of caustic soda are added and the whole heated to about 140° C. for 20 hours. The waxy product formed is suitable as a hydrophobing agent; by introducing water-solubilizing groups, excellent textile assistants having opening and softening properties are obtained.

Example 8

150 parts of technical triethanolamine (or 235 parts of tetra-ethanol ethylene diamine) are mixed with 270 parts of technical octodecyl chloride and heated to 140° C. with 42 parts of caustic soda while stirring. After separating the common salt formed, the reaction product has added to it 285 parts of stearic acid and is heated in vacuo at from 150° to 160° C. An excellent emulsifying and softening agent is obtained.

Instead of stearic acid there may also be used for example anhydrides of paraffin oxidation fatty acids which contain from about 6 to 10 carbon atoms in the molecule.

What we claim is:

1. The process for producing nitrogenous ethers which comprises causing an alkyl halide to act upon a polyalkylol amine selected from the class consisting of tri-ethanolamine, ethyl-diethanolamine, cyclohexyl-diethanolamine, diethanol aniline and benzyl-diethanolamine, with the aid of a metal compound having an alkaline action and selected from the class consisting of alkali metal and alkaline earth metal compounds.

2. The process as defined in claim 1 wherein the polyalkylol amine is tri-ethanolamine.

3. The process as defined in claim 1 wherein the alkyl halide is octodecyl chloride.

HEINRICH ULRICH.
KARLHUGO KUESPERT.

Certificate of Correction

Patent No. 2,312,135.  February 23, 1943.

HEINRICH ULRICH ET AL.

It is hereby certified that errors appear in the printed specification of the above numbered patent requiring correction as follows: Page 1, first column, line 44, for "desired" read *derived*; page 2, second column, line 38, Example 4, for "forced" read *formed*; and that the said Letters Patent should be read with these corrections therein that the same may conform to the record of the case in the Patent Office.

Signed and sealed this 15th day of April, A. D. 1947.

[SEAL]

LESLIE FRAZER,
*First Assistant Commissioner of Patents.*